United States Patent [19]

Uchinono et al.

[11] Patent Number: 5,503,793
[45] Date of Patent: Apr. 2, 1996

[54] PROCESS OF FABRICATING A THREE-DIMENSIONAL OBJECT FROM A LIGHT CURABLE LIQUID RESIN

[75] Inventors: Yoshiyuki Uchinono, Yawata; Yoshikazu Higashi, Katano, both of Japan

[73] Assignee: Matsushita Electric Works, Ltd., Osaka, Japan

[21] Appl. No.: 300,570

[22] Filed: Sep. 6, 1994

[30] Foreign Application Priority Data

Sep. 22, 1993 [JP] Japan .................. 5-236935

[51] Int. Cl.⁶ .................. B29C 35/08; B29C 41/02
[52] U.S. Cl. .................. 264/401; 156/273.3; 156/275.5; 156/307.1; 264/236; 264/308; 264/442; 427/356; 427/358; 427/510; 427/512; 427/553
[58] Field of Search .................. 264/22, 23, 69, 264/236, 308; 156/273.3, 275.5, 307.1; 427/356, 358, 508, 510, 512, 553

[56] References Cited

U.S. PATENT DOCUMENTS

| | | | |
|---|---|---|---|
| 5,071,337 | 12/1991 | Heller et al. | 264/22 X |
| 5,174,931 | 12/1992 | Almquist et al. | 264/22 |
| 5,209,878 | 5/1993 | Smalley et al. | 264/22 |
| 5,238,614 | 8/1993 | Uchinono et al. | 264/22 |

FOREIGN PATENT DOCUMENTS 63-141724  6/1988  Japan .

*Primary Examiner*—Leo B. Tentoni
*Attorney, Agent, or Firm*—Stevens, Davis, Miller & Mosher

[57] ABSTRACT

A three-dimensional object is fabricated from a light curable liquid resin by repeating the following process to superimpose a plurality of cured resin layers. The process utilizes a vessel containing a volume of the liquid resin and a vertically movable platform. In the process, the platform is immersed in the liquid resin in the vessel to dispose an overlay surface of an immediately previously cured layer sufficiently below the liquid level of the liquid resin. The platform is then raised such that the overlay surface is slightly higher than the liquid level of the liquid resin in the vessel, while keeping the liquid resin on the overlay surface connected with the surrounding liquid resin in the vessel by the effect of surface tension acting on the liquid resin. An excess amount of the liquid resin on the overlay surface is removed to form a liquid resin layer having a desired thickness. The platform is lowered such that an upper surface of the liquid resin layer is substantially in flush with the surrounding liquid level in the vessel, while keeping the desired thickness of the liquid resin layer. A light is then radiated to the liquid resin layer so as to cure it into the cured resin layer.

17 Claims, 8 Drawing Sheets

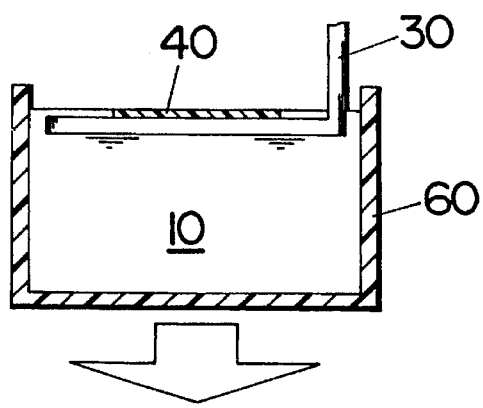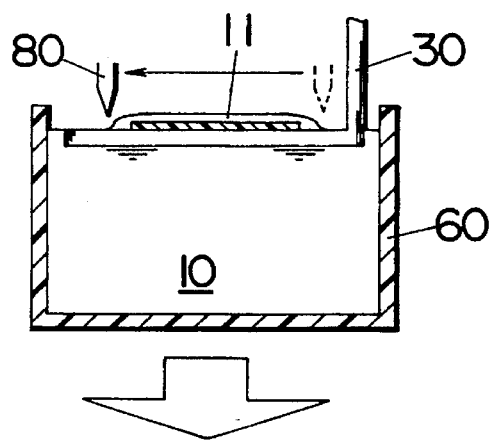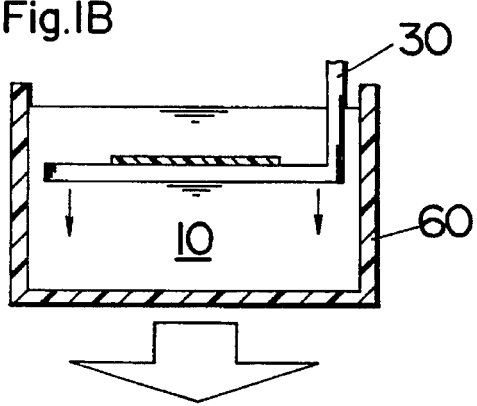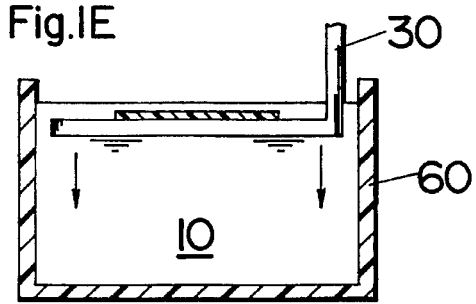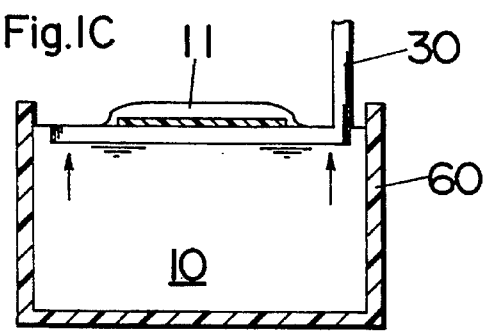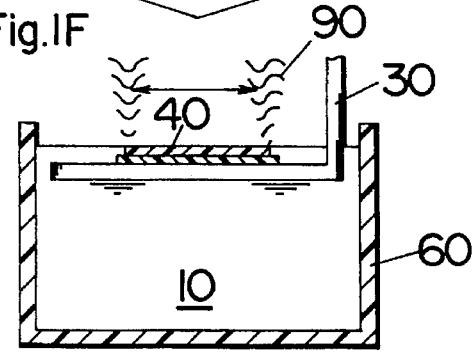

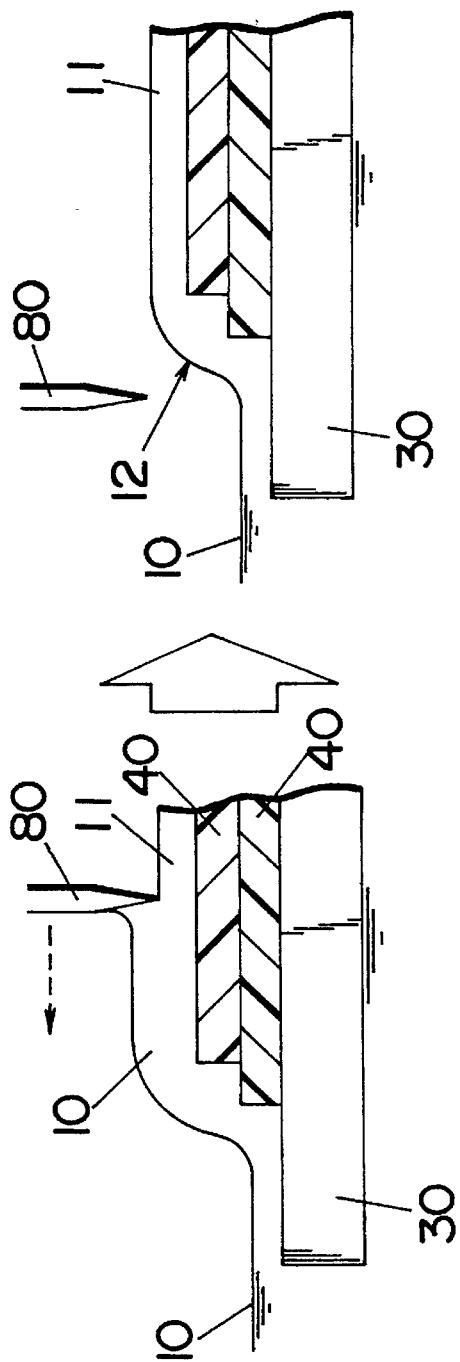
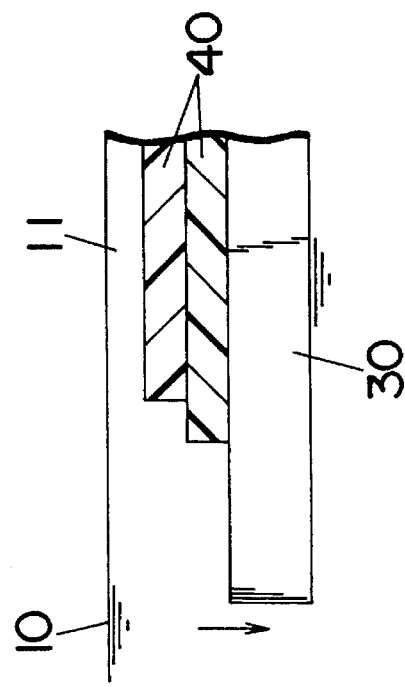

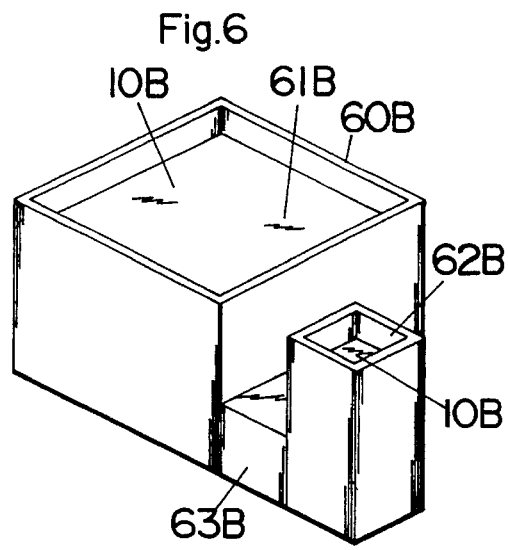
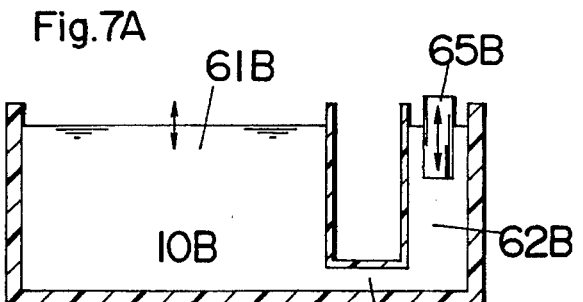
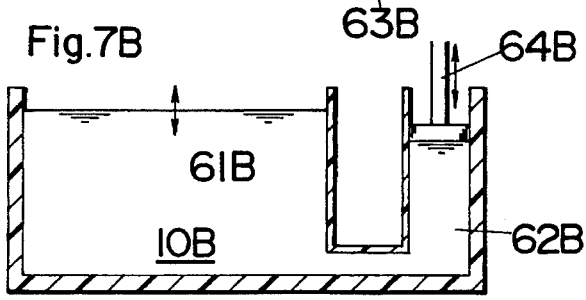
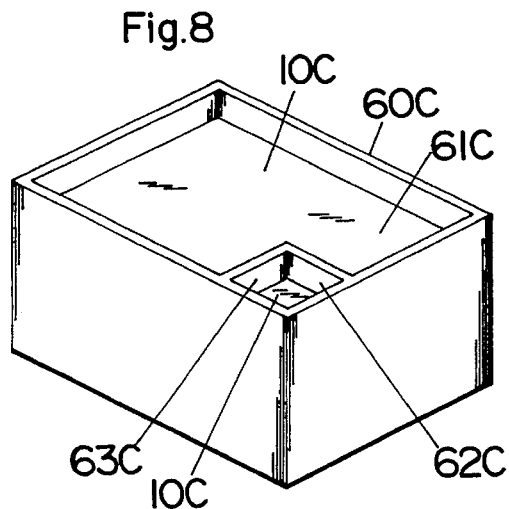
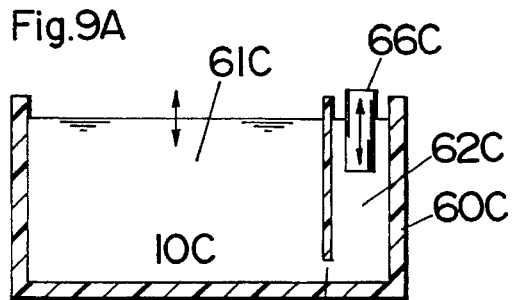
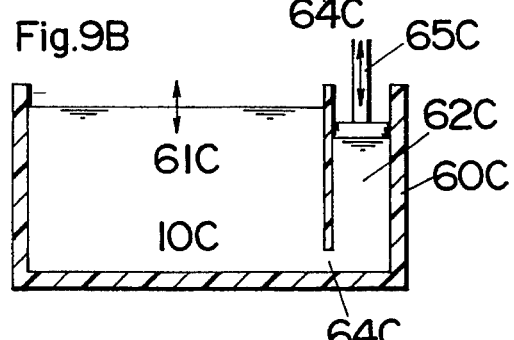
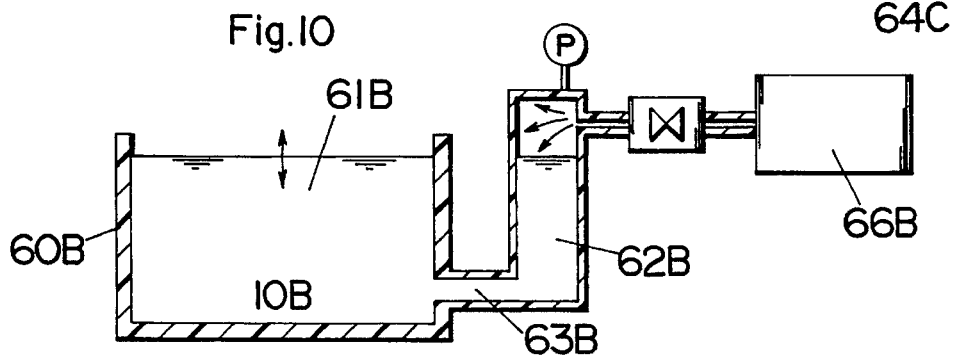

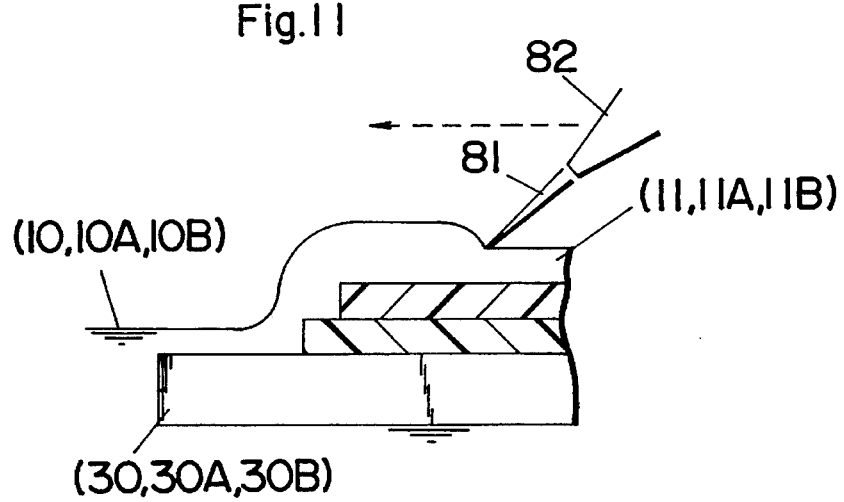
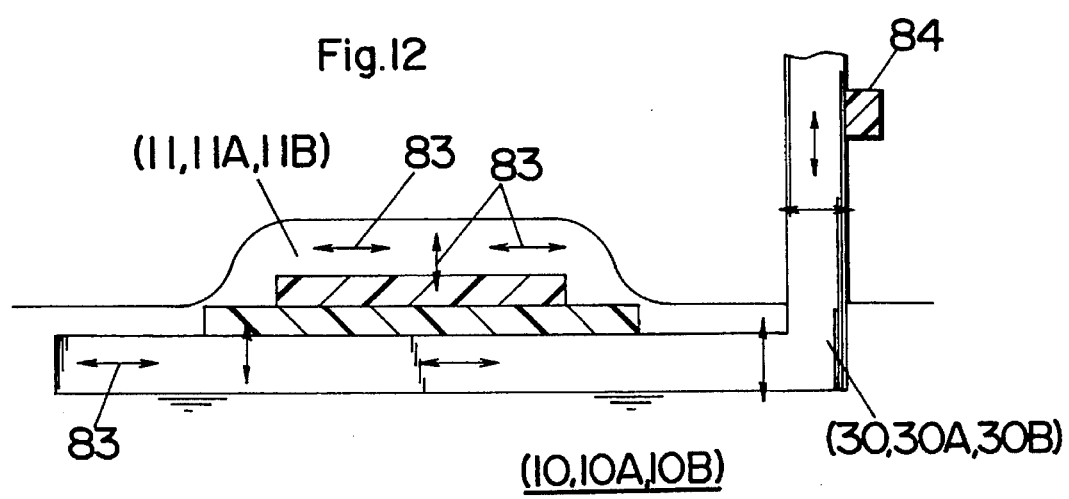
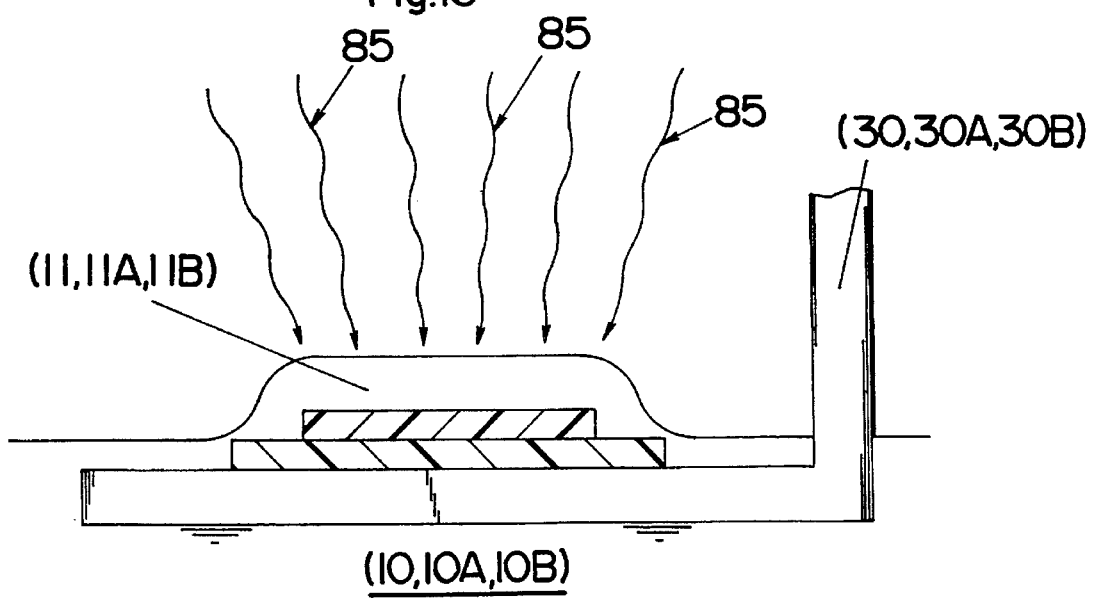

Fig.15(PRIOR ART)
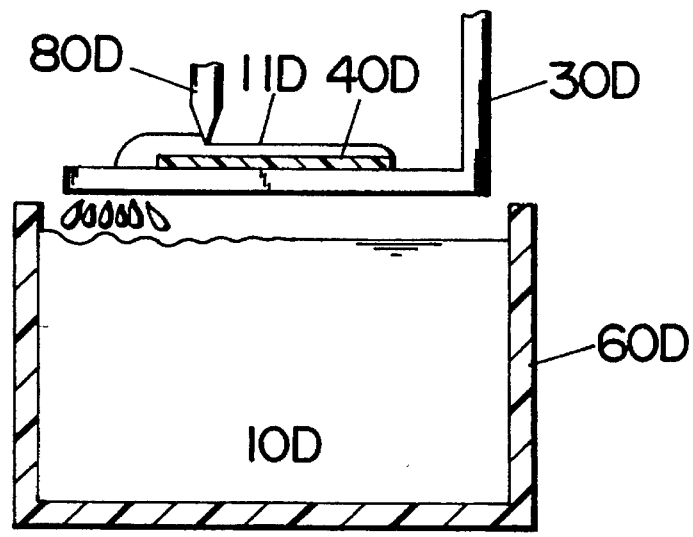
(PRIOR ART)
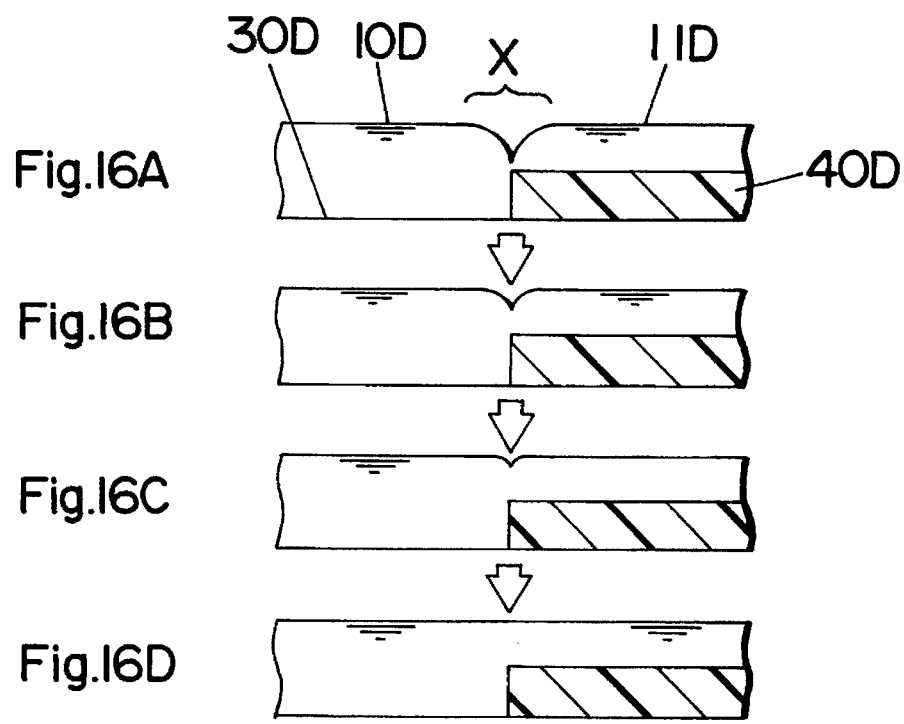
Fig.16A
Fig.16B
Fig.16C
Fig.16D

PROCESS OF FABRICATING A THREE-DIMENSIONAL OBJECT FROM A LIGHT CURABLE LIQUID RESIN

BACKGROUND OF THE INVENTION

1. A Field of the Invention

The present invention is directed to a process of efficiently fabricating a three-dimensional object from a light curable liquid resin.

2. Description of the Prior Art

A small quantity of product models or prototypes can be fabricated without using molds or machining tools in accordance with a process of fabricating a three-dimensional object by the use of a light curable liquid resin. For example, there is a process disclosed in Japanese Patent Early Publication [KOKAI] No. 63-141724. This process utilizes a vessel containing a volume of a light curable liquid resin and a movable platform. After the platform is lowered sufficiently below a liquid level of the liquid resin in the vessel, it is lifted to position an upper surface of the platform or previously cured layer just below the liquid level, so that a liquid resin coat having a desired thickness is formed on the upper surface. Subsequently, a laser beam is radiated to the liquid resin coat along a predetermined pattern to obtain a cured resin layer on the upper surface of the platform or the previously cured layer. By repeating the above explained steps, a plurality of cured resin layers are superimposed on the platform to obtain a three-dimensional object of an intended configuration.

However, there is a problem that it is difficult to precisely control the thickness of the liquid resin coat. That is, as the platform is lifted to position the upper surface of the platform or the previously cured layer just below the liquid level of the liquid resin, an excess amount of the liquid resin on the upper surface flows into the circumference of the platform to form the resin coat thereon. However, since the liquid resin is a high viscosity, it takes an extended time to transfer the excess amount of the liquid resin to the circumference of the platform. In other words, it takes the extended time to obtain the resin coat having a uniform thickness. Since the three-dimensional object is fabricated by repeating the steps of forming the resin coat and radiating the laser beam to the resin coat, such a loss of time in this process would cause a low production rate of the three-dimensional object. In particular, as the resin coat having a thinner thickness is desired, a larger amount of the liquid resin has to be removed from the platform. In addition, as a difference of height between a top surface of the resin coat and the surrounding liquid level of the liquid resin in the vessel, that is, a difference of potential energy therebetween, is smaller, it would take more extended time to obtain the resin coat having the thin thickness on the upper surface of the platform or the previously cured layer.

A process for improving the above problem is proposed in U.S. Pat. No. 5,238,614. The process utilizes a vessel 60D containing a volume of a light curable liquid resin 10D and a vertically movable platform 30D for mounting a three-dimensional object to be fabricated, as shown in FIG. 14A. After the platform 30D is lowered sufficiently below a liquid level of the liquid resin bed in the vessel 60D, as shown in FIG. 14B, it is lifted above the liquid level, as shown in FIG. 14C, such that most of the liquid resin 10D on the platform 30D rapidly drops into the vessel 60D through the circumference of the platform 30D to leave a liquid resin coat 11D on the platform 30D. A thickness of the resin coat 11D is greater than a desired thickness thereof. An excess amount of the liquid resin 10D of the resin coat 11D is removed to obtain the desired thickness thereof by sweeping a doctor blade 80D horizontally across the resin coat 10D, as shown in FIG. 14D. Subsequently, the platform 30D is immersed again into the liquid resin 10D in the vessel 60D so as to place a top surface of the resin coat 11D at the approximately same level as the surrounding liquid level of the liquid resin 10D in the vessel 60D, as shown in FIGS. 14E and 14F. A light beam 90D is radiated to the resin coat 11D along a predetermined pattern to obtain a cured resin layer 40D on the upper surface of the platform 30D or previously cured layer 40D, as shown in FIG. 14G. The above explained steps are repeated to fabricate the three-dimensional object on the platform 30D.

However, there are another problems with respect to the production rate and the accuracy of the three-dimensional object. That is, after the platform 30D is lifted above the liquid level so as to separate the liquid resin 10D on the platform 30D from the liquid resin 10D in the vessel 60D, the excess amount of the liquid resin on the platform 30D is removed by the doctor knife 80D to obtain the liquid resin coat 11D having the desired thickness. In this time, the periphery of the resin coat 11D is provided with a round edge 12D, as shown in FIG. 14D, which is caused by the effect of a surface tension of the liquid resin 10D. Immediately after the platform 30D is immersed into the liquid resin 10D in the vessel 60D so as to place the top surface of the resin coat 11D at the approximately same level as the liquid level in the vessel 60D, a gap X is generated between the round edge 12D of the resin coat 11D and the surrounding liquid resin 10D in the vessel 60D, as shown in FIGS. 14E and 16A. Though the gap X disappears within a relatively short time because only a minimum flow amount of the liquid resin 10D is necessary to fill the gap X, as shown in FIGS. 16B to 16D, it is desired to save the time required for eliminating the gap X from the viewpoint of enhancing the production rate of the three-dimensional object. If the light beam is radiated to the liquid resin coat 11D before completely eliminating the gap X, the residual round edge of the resin coat 11D would be the cause of a low accuracy or a considerable deformation of the three-dimensional object.

In addition, when the platform 30D is lifted above the liquid level, it is thought that the excess amount of the liquid resin 10D on the platform 30D rapidly drops into the vessel 60D through the circumference of the platform 30D. As a result, a surface of the liquid resin 10D in the vessel 60D would be fretted by the dropped liquid resin from the platform 30D, as shown in FIG. 15. When the resin coat 11D on the platform 30D is immersed into the liquid resin 10D in the vessel 60D, thus fretted surface of the liquid resin 10D would prevent to form a flat surface of the resin coat 11D which is placed at the approximately same level as the liquid level 10D of the liquid resin 10D in the vessel 60D. Consequently, it would require more extended time for smoothing the fretted surface of the liquid resin 10D. If the light beam 90D is radiated to the resin coat 11D without sufficiently smoothing the fretted surface of the liquid resin 10D, the cured resin layer 40D having a uniform thickness could not be obtained on the platform 30D or the previously cured resin layer 40D.

SUMMARY OF THE INVENTION

Therefore, a primary object of the present invention is to provide a process for improving the above problems, that is, a process of efficiently fabricating a three-dimensional object from a light curable liquid resin of viscous nature by radiating a light to a surface of the liquid resin to have successive cross-sectional layers of cured resin and superimposing the cross-sectional layers on each other. The process utilizes a vessel containing a volume of the liquid resin and a platform vertically movable and carrying thereon a stratum of the liquid resin which is to be subsequently cured by exposure to the radiation of the light into the cross-sectional cured layer. In the process of the present invention, the platform is immersed in the liquid resin in the vessel to a depth at which an overlay surface of a previously cured layer is disposed below a liquid level of the liquid resin by a distance more than a thickness required for the subsequent cured layer. The platform is then raised to position the overlay surface on or above the liquid level of the liquid resin in order to carry the liquid resin on the overlay surface, while keeping the liquid resin on the overlay surface connected with the surrounding liquid resin in the vessel by the effect of surface tension acting on the liquid resin. An excess amount of the liquid resin on the overlay surface is removed to provide the stratum of the liquid resin held on the overlay surface. Subsequently, the platform is lowered to position an upper surface of the stratum substantially in flush with the surrounding liquid level to thereby give a continuous flush top surface to the stratum extending over substantially the entire overlay surface with a desired thickness. The light is radiated to the stratum so as to cure it into the cross-sectional layer of the cured resin. In this process, since the liquid resin on the overlay surface is always connected with the liquid resin left in the vessel, it is not necessary to consider the loss of time with respect to the elimination of the above explained gap X. In addition, it is possible to keep a surface of the liquid resin in the vessel smoothly during the present process without causing a fretted surface of the liquid resin.

In a preferred process of the present invention, the platform is held in the liquid resin in the vessel to a position at which the overlay surface is on or above the surrounding liquid level of the liquid resin. Subsequently, a fresh light curable liquid resin is supplied on the overlay surface from above in order to put on the overlay surface the fresh liquid resin and to make it connected to the surrounding liquid resin in the vessel by the effect of surface tension acting on the liquid resin. An excess amount of the liquid resin on the overlay surface is removed to provide a stratum of the liquid resin held on the overlay surface. The platform is lowered to position an upper surface of the stratum substantially in flush with the surrounding liquid level to thereby give a continuous flush top surface to the stratum extending over substantially the entire overlay surface with a desired thickness. The light is radiated to the stratum so as to cure it into a cross-sectional layer of the cured resin. Therefore, it is preferred from the viewpoint of improving a production rate of the three-dimensional object that the fresh liquid resin is supplied on the overlay surface from above in place of the step of immersing the platform in the liquid resin in the vessel to the depth at which the overlay surface is disposed below the liquid level of the liquid resin by the distance more than the thickness required for the subsequent cured layer.

In a further preferred process of the present invention, a liquid level of the liquid resin in the vessel can be controlled to form a stratum of the liquid resin on the overlay surface in place of moving the platform upward and downward in the vessel. That is, a liquid level of the liquid resin in the vessel is raised over the overlay surface while keeping a fixed elevation of the platform so as to supply the liquid resin on the overlay surface. The liquid level is lowered to or below the overlay surface while keeping the liquid resin on the overlay surface connected with the surrounding liquid resin in the vessel by the effect of surface tension acting on the liquid resin. An excess amount of the liquid resin on the overlay surface is removed to provide the stratum of the liquid resin. The surrounding liquid level in the vessel is positioned substantially in flush with an upper surface of the stratum to thereby give a continuous flush top surface to the stratum extending over substantially the entire overlay surface with a desired thickness. The light is radiated to the stratum so as to cure it into a cross-sectional layer of the cured resin. In this case, it is also preferred that the vessel has its lower portion which is in liquid communication with an auxiliary vessel, and the lowering and raising the liquid level of the liquid resin in the vessel are made respectively by lowering and raising a liquid level in the auxiliary vessel.

In any one of the above processes of the present invention, it is preferred that the removal of the excess amount of the liquid resin is facilitated by means of sweeping a blade horizontally across the liquid resin on the overlay surface, by blowing an forced gas flow across the liquid resin, by applying vibrations to the liquid resin, or by lowering the viscosity of the liquid resin. Of course, it is possible to facilitate the removal of the liquid resin by combining the means.

These and still other objects and advantageous features of the present invention will become more apparent from the following detailed description of the preferred embodiments when taken in conjunction with the attached drawings.

BRIEF DESCRIPTION OF THE DRAWINGS

FIGS. 1A to 1F are schematic diagrams for understanding a process of fabricating a three-dimensional object form a light curable liquid resin of a first embodiment of the present invention;

FIGS. 2A to 2C explain steps of removing an excess amount of the liquid resin by the use of a movable blade and lowering a platform mounting two previously cured resin layers thereon into the liquid resin;

FIG. 6 is a perspective view of a vessel utilized in the third embodiment;

FIGS. 7A and 7B respectively show means of moving a liquid level of the liquid resin in the vessel upward and downward, respectively;

FIG. 8 is a perspective view of another vessel for the third embodiment;

FIGS. 9A and 9B respectively show means of moving a liquid level of the liquid resin in the vessel of FIG. 8 upward and downward;

FIG. 10 shows another means of moving the liquid level of the liquid resin in the vessel of FIG. 6;

FIG. 11 explains a step of removing an excess amount of the liquid resin by the use of a compressed air supplied from an air nozzle;

FIG. 12 explains a step of removing an excess amount of the liquid resin by the use of ultrasonic vibrations;

FIG. 13 explains a step of removing an excess amount of the liquid resin by the use of infrared rays;

FIG. 15 indicates a problem of the prior art's process of fabricating a three-dimensional object from a light curable liquid resin; and FIGS. 16A to 16D show disappearance of a gap generated between a rounded periphery of the liquid resin on a platform and the surrounding liquid resin during the prior art's process.

DETAILED DESCRIPTIONS OF THE PREFERRED EMBODIMENTS

<First Embodiment>

Figure 3A:
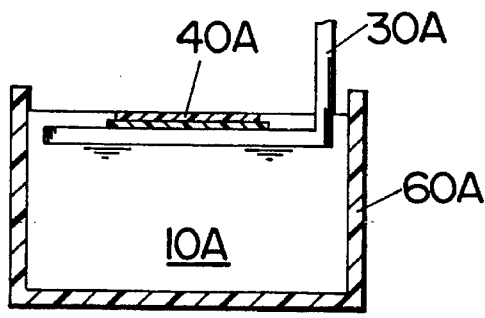
FIGS. 3A to 3F are schematic diagrams for understanding a process of fabricating a three-dimensional object from the liquid resin of a second embodiment of the present invention.

A three-dimensional object of an intended configuration is fabricated from a light curable liquid resin 10 by utilizing a process of the first embodiment of the present invention. This process uses a vessel 60 containing a volume of the liquid resin 10 and a vertically movable platform 30, as shown in FIG. 1A. A first cured layer 40 is formed on the platform 30. That is, the platform 30 is lowered sufficiently below a liquid level of the liquid resin 10 in the vessel 60, and then lifted to position an upper surface of the platform 30 just below the liquid level in order to form a first liquid resin layer (not shown) having a desired thickness on the platform 30. After a waiting time passes to obtain a flat surface and uniform thickness of the first liquid resin layer, a laser beam is radiated to the first liquid resin layer along a predetermined pattern to obtain the first cured resin layer 40 on the platform 30. In this embodiment, the first cured resin layer 40 is formed on the platform 30 by the prior art process. However, it is, of course, possible to adopt the following process of the present invention in place of the prior art process to form the first cured resin layer 40.

Subsequently, the platform 30 is immersed in the liquid resin 10 in the vessel 60 to a depth at which an overlay surface of an immediately previous cured resin layer 40 on the platform 30 is disposed sufficiently below the liquid level of the liquid resin 10 in the vessel 60, as shown in FIG. 1B. The platform 30 is then raised such that an upper surface of the liquid resin 10 on the overlay surface is slightly higher than the liquid level of the liquid resin 10 left in the vessel 60, while keeping the liquid resin 10 on the overlay surface connected with the surrounding liquid resin in the vessel 60 by the effect of surface tension of the liquid resin 10, that is, keeping the liquid resin 10 on the overlay surface continuous with the surrounding liquid resin in the vessel 30, as shown in FIG. 1C. After most of the liquid resin 10 on the overlay surface flows into the vessel 60, a liquid resin layer 11 is left on the overlay surface. A thickness of the liquid resin layer 11 is slightly greater than a desired thickness of the liquid resin layer 11 required for a cured resin layer 40 to be formed on the overlay surface later. An excess amount of the liquid resin 10 of the liquid resin layer 11 is removed by sweeping a doctor blade 80 horizontally across the liquid resin layer 11, as shown in FIGS. 1D, 2A and 2B, while keeping the liquid resin layer 11 connected with the surrounding liquid resin 10 left in the vessel 60 by the effect of surface tension of the liquid resin. As a result, the liquid resin layer 11 having the desired thickness is formed on the overlay surface. The connection between the liquid resin layer 11 and the liquid resin 10 in the vessel 60 is maintained by the liquid resin having a smoothly curved surface 12, as shown in 2B. Next, the platform 30 is lowered to position a top surface of the liquid resin layer 11 substantially in flush with the surrounding liquid level of the liquid resin 10 in the vessel 30, while keeping the desired thickness of the liquid resin layer 11, as shown in FIGS. 1E and 2C. In FIGS. 2A to 2C, two previous cured resin layers 40 are formed on the platform 30. Since the liquid resin layer 11 is always connected with the surrounding liquid resin 10 in the vessel 60 by the effect of the surface tension of the liquid resin 10, it is possible to rapidly dispose the top surface of the liquid resin layer 11 substantially in flush with the surrounding liquid level in the vessel 60, without fretting the liquid resin 60 in the vessel 60. Subsequently, a laser beam 90 is radiated to the liquid resin layer 11 along a predetermined pattern to form the cured resin layer 40 on the overlay surface, as shown in FIG. 1F.

By repeating the above explained process of the first embodiment, a plurality of cured resin layers 40 can be superimposed on the first cured resin layer 40 to obtain the three-dimensional object. From the viewpoint of improving the production rate and the accuracy of the three-dimensional object, it should be noted that it is very important point to keep during the present process the connection between the liquid resin layer 11 and the surrounding liquid resin 10 in the vessel 60 by the effect of the surface tension of the liquid resin.

<Second Embodiment>

Figure 3D:
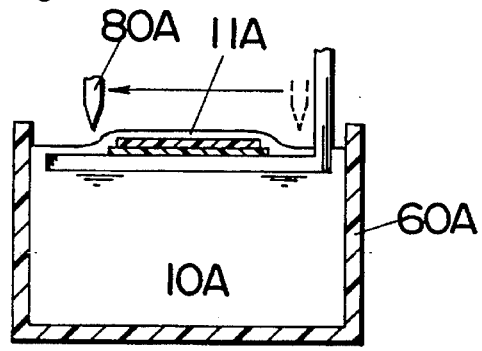
Figure 3B:
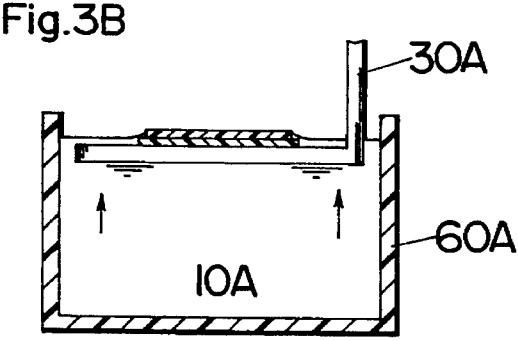
Figure 3E:
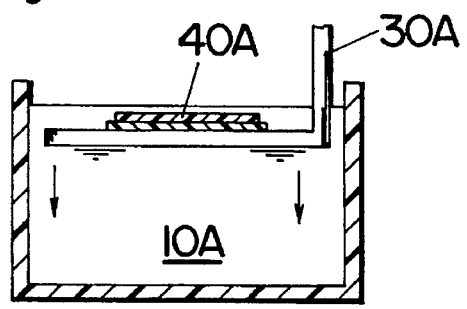
Figure 3C:
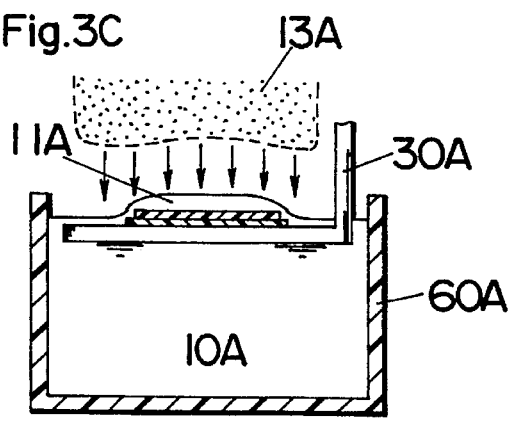
Figure 3F:
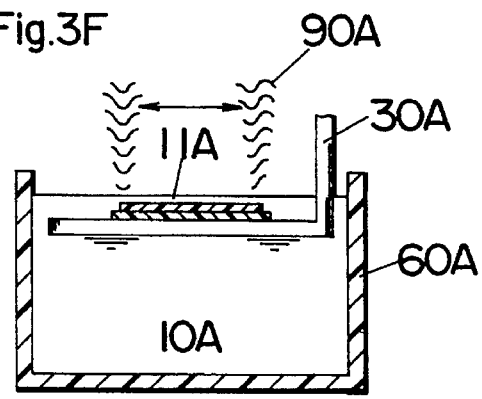

A three-dimensional object is fabricated from a light curable liquid resin 10A by utilizing a process of the second embodiment of the present invention. This process uses a vessel 60A containing a volume of the liquid resin 10A and a vertically movable platform 30A, as shown in FIG. 3A. The platform 30A is disposed such that an overlay surface of an immediately previous cured resin layer 40A is slightly higher than the liquid level of the liquid resin 10A in the vessel 60A, as shown in FIG. 3B. An additional liquid resin 13A is then supplied from above to the platform 30A to form a liquid resin layer 11A on the overlay surface, as shown in FIG. 3C. For example, the liquid resin layer 11A is formed by horizontally moving a nozzle (not shown) across the overlay surface while supplying the additional liquid resin 13A from the nozzle. Most of the additional liquid resin 13A supplied on the overlay surface flows into the vessel 60A. A thickness of the liquid resin layer 11A is greater than a desired thickness thereof. An excess amount of the liquid resin of the liquid resin layer 11A is removed to obtain the desired thickness thereof by sweeping a doctor blade 80A across the liquid resin layer 11A, as shown in FIG. 3D, while keeping the liquid resin layer 11A connected with the surrounding liquid resin 10A left in the vessel 60A by the effect of surface tension of the liquid resin 10A. Next, the platform 30A is lowered to position a top surface of the liquid resin layer 11A substantially in flush with the surrounding liquid level of the liquid resin 10A in the vessel 60A, while keeping the desired thickness of the liquid resin layer 11A, as shown in FIG. 3E. Subsequently, a laser beam 90A is radiated to the liquid resin layer 11A along a predetermined pattern to form a cured resin layer 40A on the overlay surface, as shown in FIG. 3F.

Figure 4:
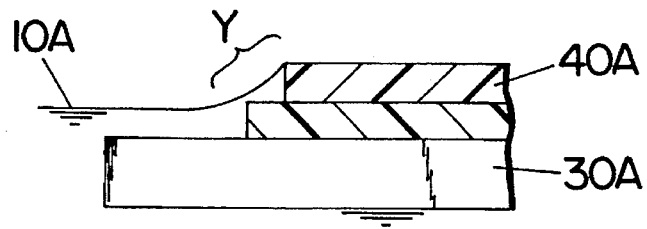
FIG. 4 is an enlarged diagram of FIG. 3B.

By repeating the above process of the second embodiment, a plurality of cured resin layers 40A can be superimposed on the platform 30A to obtain the three-dimensional object. In this process, when the overlay surface of the previous cured resin layer 40A is slightly higher than the liquid level of the liquid resin 10A in the vessel 60A, it is preferred that the liquid resin 10A in the vessel 60A is contacted with the periphery of the previously cured resin layer 40A by the effect of surface tension of the liquid resin, as shown by the letter "Y" of FIG. 4A.

<Third Embodiment>

A three-dimensional object is fabricated from a light curable liquid resin 10B by utilizing a process of the third embodiment of the present invention. The process uses a movable platform 30B and a vessel 60B containing a volume of the liquid resin 10B. In the third embodiment, the vessel 60B is formed with a main bath 61B for incorporating the platform 30B, an auxiliary bath 62B, and a communication path 63B connected between the main and auxiliary baths 61B and 62B, as shown in FIG. 6. Therefore, it is possible to shift a liquid level of the liquid resin 10B in the main bath 61B upward and downward relative to the platform 30B by lowering and raising a liquid level of the liquid resin 10B in the auxiliary bath 62B with the use of a piston 64B, as shown in FIGS. 7B. Of course, it is also possible to shift the liquid level of the liquid resin 10B in the main bath 61B by controlling upward and downward movements of a block 65B in the liquid resin 10B in the auxiliary bath 62B, as shown in FIG. 7A.

Figure 5A:
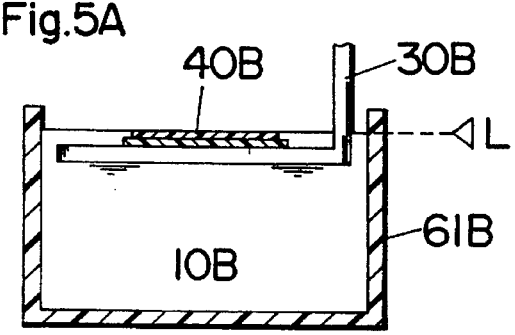
FIGS. 5A to 5G are schematic diagrams for understanding a process of fabricating a three-dimensional object from the liquid resin of a third embodiment of the present invention.
Figure 5D:
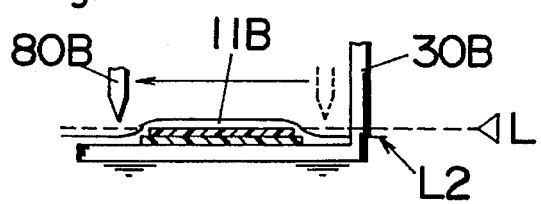
Figure 5E:
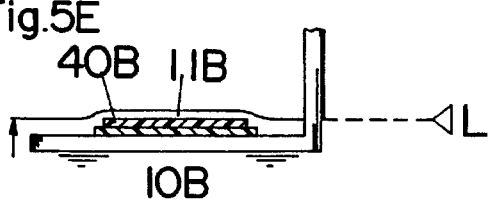
Figure 5C:
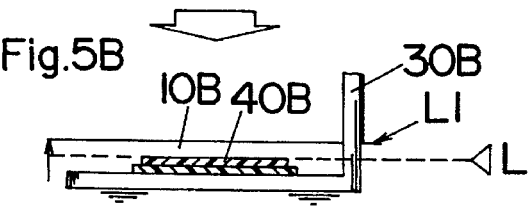
Figure 5F:
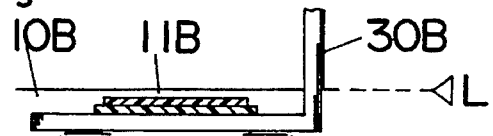
Figure 5G:
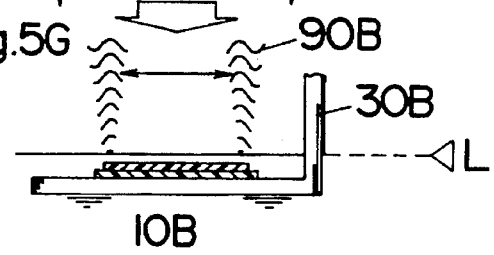
Figure 5B:
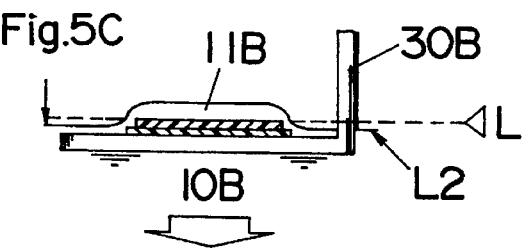
Figure 14A:
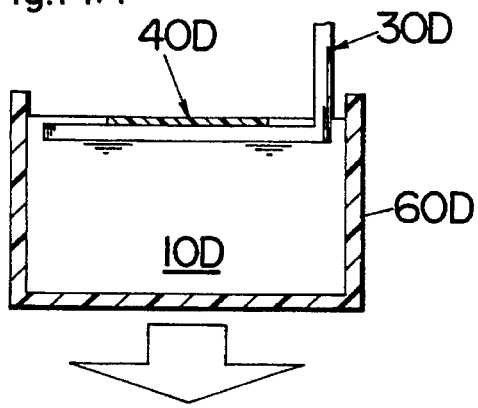
FIGS. 14A to 14G are schematic diagrams for understanding a process of fabricating a three-dimensional object form a light curable liquid resin of the prior art.
Figure 14E:
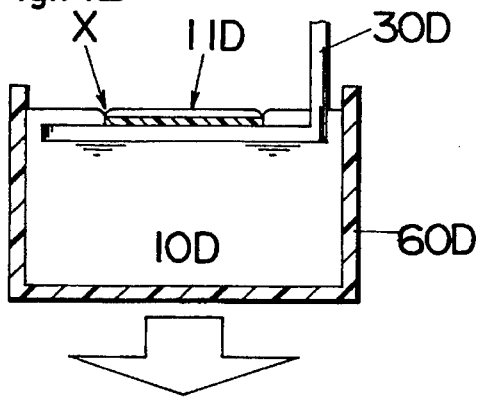
Figure 14B:
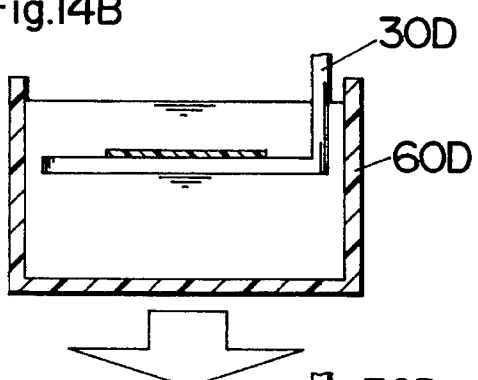
Figure 14F:
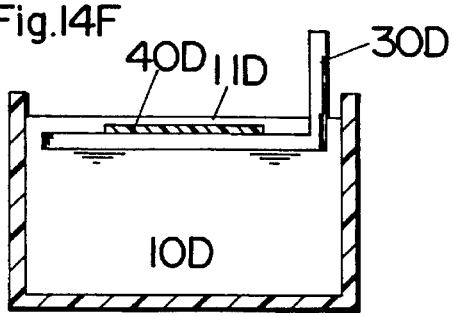
Figure 14C:
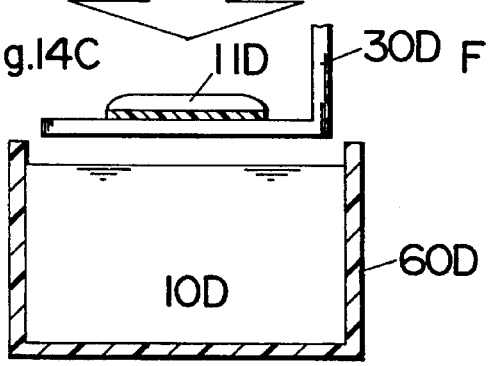
Figure 14G:
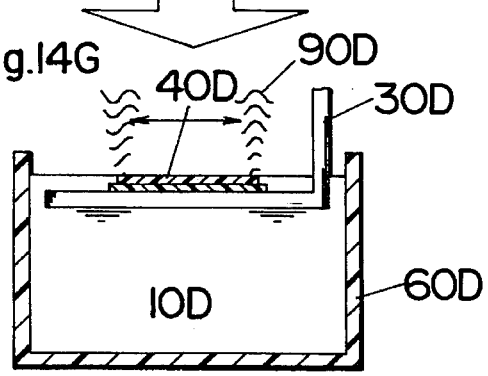
Figure 14D:
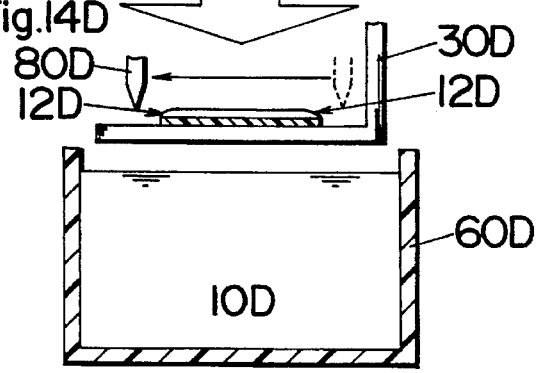

In this embodiment, the platform 30B is immersed in the liquid resin 10B in the main bath 61B such that an overlay surface of an immediately previously cured resin layer 40B is placed at the approximately same level as the liquid level of the liquid resin 10B in the main bath 61B, as shown in FIG. 5A. The liquid level of the liquid resin 10B is defined as a base level "L". The liquid level of the liquid resin 10B is elevated from the base level "L" to a first level "L1" to supply the liquid resin 10B on the overlay surface, as shown in FIG. 5B. Subsequently, the liquid level of the liquid resin 10B is lowered from the first level "L1" to a second level "L2" to form a liquid resin layer 11B on the overlay surface, as shown in FIG. 5C. The second level "L2" is lower than the base level "L". A connection between the liquid resin layer 11B and the liquid resin 10B in the main bath 61B is maintained by the effect of surface tension of the liquid resin. A thickness of the liquid resin layer 11B is greater than a desired thickness thereof. An excess amount of the liquid resin of the liquid resin layer 11B is removed to obtain the desired thickness thereof by sweeping a doctor blade 80B across the liquid resin layer 11B, as shown in FIG. 5D. The liquid level of the liquid resin 10B in the vessel 61B is then elevated from the second level "L2" to the base level "L" as shown in FIG. 5E A top surface of the liquid resin layer 11B is higher than the base level "L". The platform 30B is lowered to position the top surface of the liquid resin layer 11B substantially in flush with the base level "L" of the liquid resin 10B, while keeping the desired thickness of the liquid resin layer 11B, as shown in FIG. 5F. Subsequently, a laser beam 90B is radiated to the liquid resin layer 11B along a predetermined pattern to form a cured resin layer 40B on the overlay surface, as shown in FIG. 5G.

By repeating the above process of the third embodiment, a plurality of cured resin layers 40B can be superimposed on the platform 30B to obtain the three-dimensional object. In the above process, for disposing the top surface of the liquid resin layer 11B substantially in flush with the liquid level of the liquid resin 10B in the main bath 61B, it is possible to elevate the liquid level of the liquid resin 10B in the main bath 61B in place of lowering the platform 30B, as shown in FIG. 5F. However, the following advantages are expected in case of lowering the platform 30B. First, the laser beam 90B can be stably radiated to the liquid resin layer 11B without varying a distance between the top surface of liquid resin layer 11B and a laser beam source (not shown). Second, since the liquid level in the liquid resin 10B in the main bath 61B is disposed to the base level "L" at every radiation of the laser beam 90B, the liquid level of the liquid resin 10B in the main bath 61B can be readily controlled when repeating the process of the third embodiment.

By the way, as shown in FIG. 8, it is possible to utilize another vessel 60C in place of the above vessel 60B. The vessel 60C comprises a large bath 61C and a small bath 62C which is separated from the large bath 61C by a partition 63C. The large bath 61C is connected with the small bath 62C through a communication hole 64C of the partition 63C. Therefore, it is possible to shift a liquid level of a light curable liquid resin 10C in the large bath 61C upward and downward by lowering and raising a liquid level of the liquid resin 10C in the small bath 62C with the use of a piston 65C, as shown in FIGS. 9B. Of course, it is possible to shift the liquid level of the liquid resin 10C in the large bath 61C by controlling upward and downward movements of a block 66C in the liquid resin 10C in the small bath 62C, as shown in FIG. 9A.

In addition, it is also preferred that the liquid level of the liquid resin 10B is shifted upward and downward by the use of a pressurized air supplied from a compressor 66B, as shown in FIG. 10.

In the above embodiments, it is preferred that the excess amount of the liquid resin (10, 10A, 10B) of the liquid resin layer (11, 11A, 11B) is removed by the use of a compressed air 81 supplied from an air nozzle 82 in place of the use of the doctor blade (80, 80A, 80B), as shown in FIG. 11. The thickness of the liquid resin layer (11, 11A, 11B) can be determined by varying an injection pressure of the compressed air 81. The removal of the excess amount of the liquid resin by the use of the compressed air 81 can be stably repeated without causing a contamination of the liquid resin. Furthermore, it is preferred that ultrasonic vibrations 83 are applied to the platform (30, 30A, 30B) to facilitate the removal of the excess amount of the liquid resin, as shown in FIG. 12. Numeral 84 designates an ultrasonic generator. By applying the ultrasonic vibrations 83, the fluidity of the liquid resin is increased, and the top surface of liquid resin layer (11, 11A, 11B) is efficiently smoothed. Of course, it is possible to apply the ultrasonic vibrations 83 to the platform (30, 30A, 30B) while utilizing the doctor blade (80, 80A, 80B) or the compressed air 81. Additionally, it is preferred that infrared rays 85 are radiated to the liquid resin layer (11, 11A, 11B) to facilitate the removal of the excess amount of the liquid resin, as shown in FIG. 13. Since a viscosity of the liquid resin is decreased by the radiation of the infrared rays 85, the fluidity of the liquid resin is increased. It is possible to radiate the infrared rays 85 to the liquid resin layer (11, 11A, 11B) while utilizing the doctor blade (80, 80A, 80B) or the compressed air 81, or applying the ultrasonic vibrations 83. Moreover, it is possible to utilize a heated air in place of the radiation of the infrared rays 85.

What is claimed is:

1. A process of fabricating a three-dimensional object from a light curable liquid resin of viscous nature comprising the steps of:

radiating a light to a surface of said light curable liquid resin to have successive cross-sectional layers of cured resin and superimposing said cross-sectional layers on each other, said process utilizing a vessel containing a volume of said light curable liquid resin and a platform vertically movable and carrying thereon a stratum of said light curable liquid resin which is to be subsequently cured by exposure to the radiation of said light into said cross-sectional layer, a previously cured layer defining thereon a top surface, said top surface providing an overlay surface with respect to the next superimposed cured layer, wherein:
a) said platform is immersed in the volume of said light curable liquid resin in said vessel to a depth at which said overlay surface is disposed below the liquid level of said light curable liquid resin by a distance more than a thickness required for the subsequent cured layer;
b) said platform is raised to position said overlay surface on or above the surrounding liquid level of said light curable liquid resin in order to carry said liquid resin on said overlay surface while keeping said light curable liquid resin on said overlay surface connected with the surrounding liquid resin in said vessel by the effect of surface tension acting on said light curable liquid resin;
c) an excess amount of said light curable liquid resin on said overlay surface is removed to provide said stratum of said light curable liquid resin held on said overlay surface;
d) said platform is lowered to position an upper surface of said stratum substantially in flush with said surrounding liquid level to thereby give a continuous flush top surface to said stratum extending over substantially the entire overlay surface with a desired thickness; and
e) said light is radiated to said stratum so as to cure it into said cross-sectional layer of said cured resin.

2. A process of fabricating a three-dimensional object from a light curable liquid resin of viscous nature comprising the steps of:
radiating a light to a surface of said light curable liquid resin to have successive cross-sectional layers of cured resin and superimposing said cross-sectional layers on each other, said process utilizing a vessel containing a volume of said light curable liquid resin and a platform vertically movable and carrying thereon a stratum of said light curable liquid resin which is to be subsequently cured by exposure to the radiation of said light into said cross-sectional cured layer, a previously cured layer defining thereon an overlay surface with respect to the next superimposed cured layer, wherein:
a) said platform is held in the volume of said light curable liquid resin in said vessel to a position at which said overlay surface is on or above the surrounding liquid level of said light curable liquid resin;
b) a fresh light curable liquid resin is supplied on said overlay surface from above in order to put on said overlay surface said fresh liquid resin and to make it connected with the surrounding liquid resin in said vessel by the effect of surface tension acting on said light curable liquid resin;
c) an excess amount of said light curable liquid resin on said overlay surface is removed to provide said stratum of said light curable liquid resin held on said overlay surface;
d) said platform is lowered to position an upper surface of said stratum substantially in flush with said surrounding liquid level to thereby give a continuous flush top surface to said stratum extending over substantially the entire overlay surface with a desired thickness; and
e) said light is radiated to said stratum so as to cure it into said cross-sectional layer of said cured resin.

3. A process of fabricating a three-dimensional object from a light curable liquid resin of viscous nature comprising the steps of:
radiating a light to a surface of said light curable liquid resin to have successive cross-sectional layers of cured resin and superimposing said cross-sectional layers on each other, said process utilizing a vessel containing a volume of said light curable liquid resin and a platform vertically movable and carrying thereon a stratum of said light curable liquid resin which is to be subsequently cured by exposure to the radiation of said light into said cross-sectional cured layer, a previously cured layer defining thereon an overlay surface with respect to the next superimposed cured layer, wherein:
a) a liquid level of said light curable liquid resin in said vessel is raised over said overlay surface with said platform kept at a fixed elevation so as to supply said light curable liquid resin on said overlay surface;
b) said liquid level is lowered to or below said overlay surface with said platform kept at the fixed elevation in order to leave said light curable liquid resin on said overlay surface while keeping said light curable liquid resin on said overlay surface connected with the surrounding liquid resin in said vessel by the effect of surface tension acting on said light curable liquid resin;
c) an excess amount of said light curable liquid resin on said overlay surface is removed to provide said stratum of said light curable liquid resin held on said overlay surface;
d) said surrounding liquid level is positioned substantially in flush with an upper surface of said stratum to thereby give a continuous flush top surface to said stratum extending over substantially the entire overlay surface with a desired thickness; and
e) said light is radiated to said stratum so as to cure it into said cross-sectional layer of said cured resin.

4. A process as set forth in claim 3, wherein said vessel has its lower portion which is in liquid communication with an auxiliary vessel, and wherein said lowering and raising said liquid level of said light curable liquid resin in said vessel are made respectively by lowering and raising a liquid level in said auxiliary vessel.

5. A process as set forth in claim 1, wherein said step c) comprises sweeping a blade horizontally across said light curable liquid resin on said overlay surface to remove the excess amount of said light curable liquid resin.

6. A process as set forth in claim 1, wherein said step c) comprises blowing a forced gas flow across said light curable liquid resin on said overlay surface to remove the excess amount of said light curable liquid resin.

7. A process as set forth in claim 1, wherein said step c) comprises applying vibrations to said light curable liquid resin on said overlay surface to facilitate removal of the excess amount of said light curable liquid resin.

8. A process as set forth in claim 1, wherein said step c) comprises lowering viscosity of said light curable liquid resin on said overlay surface to facilitate removal of the excess amount of said light curable liquid resin.

9. A process as set forth in claim 2, wherein said step c) comprises sweeping a blade horizontally across said light curable liquid resin on said overlay surface to remove the excess amount of said light curable liquid resin.

10. A process as set forth in claim 2, wherein said step c) comprises blowing a forced gas flow across said light curable liquid resin on said overlay surface to remove the excess amount of said light curable liquid resin.

11. A process as set forth in claim 2, wherein said step c) comprises applying vibrations to said light curable liquid resin on said overlay surface to facilitate removal of the excess amount of said light curable liquid resin.

12. A process as set forth in claim 2, wherein said step c) comprises lowering viscosity of said light curable liquid resin on said overlay surface to facilitate removal of the excess amount of said light curable liquid resin.

13. A process as set forth in claim 3, wherein said step c) comprises sweeping a blade horizontally across said light curable liquid resin on said overlay surface to remove the excess amount of said light curable liquid resin.

14. A process as set forth in claim 3, wherein said step c) comprises blowing a forced gas flow across said light curable liquid resin on said overlay surface to remove the excess amount of said light curable liquid resin.

15. A process as set forth in claim 3, wherein said step c) comprises applying vibrations to said light curable liquid resin on said overlay surface to facilitate removal of the excess amount of said light curable liquid resin.

16. A process as set forth in claim 3, wherein said step c) comprises lowering viscosity of said light curable liquid resin on said overlay surface to facilitate removal of the excess amount of said light curable liquid resin.

17. A process as set forth in claim 1, wherein said previously cured layer defines thereon at least one side surface below said top surface.

* * * * *